United States Patent
Maier

(10) Patent No.: US 8,813,500 B2
(45) Date of Patent: Aug. 26, 2014

(54) COMBINED HEAT EXCHANGER EXPANDER MOUNTING SYSTEM

(75) Inventor: William C. Maier, Almond, NY (US)

(73) Assignee: Dresser-Rand Company, Olean, NY (US)

( * ) Notice: Subject to any disclaimer, the term of this patent is extended or adjusted under 35 U.S.C. 154(b) by 211 days.

(21) Appl. No.: 13/562,370

(22) Filed: Jul. 31, 2012

(65) Prior Publication Data

US 2014/0109574 A1 Apr. 24, 2014

Related U.S. Application Data

(60) Provisional application No. 61/514,545, filed on Aug. 3, 2011.

(51) Int. Cl.
*F01K 13/00* (2006.01)
*F16M 5/00* (2006.01)
*F01K 25/08* (2006.01)

(52) U.S. Cl.
USPC ............. 60/669; 60/671; 60/797; 165/67; 248/678

(58) Field of Classification Search
CPC ........ F01K 13/006; F01K 11/02; F16M 1/08; F16M 5/00; F16M 9/00; E02D 27/44; F28F 9/00–9/268; F02B 63/042; F02B 63/044–63/048; F01D 15/10; F01D 15/12
USPC ............. 60/643–684, 693, 694, 715–717, 60/796–797; 248/678, 679, 346.01–346.5; 290/1 A, 52; 415/213.1; 165/51, 52, 67, 165/68, 138, 140
See application file for complete search history.

(56) References Cited

U.S. PATENT DOCUMENTS

| | | | | |
|---|---|---|---|---|
| 1,491,423 A * | 4/1924 | Rice | | 60/687 |
| 1,814,627 A * | 7/1931 | Allen | | 60/687 |
| 2,531,178 A * | 11/1950 | Van Nest | | 60/687 |
| 2,697,790 A * | 12/1954 | Kirkpatrick | | 290/52 |
| 3,742,241 A * | 6/1973 | Gate et al. | | 290/52 |
| 3,968,834 A * | 7/1976 | Mangus et al. | | 165/82 |
| 4,262,485 A * | 4/1981 | Kuroda et al. | | 60/669 |
| 4,747,360 A * | 5/1988 | Tuncel et al. | | 114/269 |
| 4,793,768 A * | 12/1988 | Fairchild et al. | | 415/119 |
| 4,850,091 A * | 7/1989 | Stadelmann | | 29/402.08 |
| 5,675,881 A * | 10/1997 | Stadelmann | | 29/402.08 |
| 5,996,334 A * | 12/1999 | Richardson | | 60/797 |
| 6,360,543 B2 * | 3/2002 | Koronya et al. | | 60/690 |
| 6,601,392 B2 * | 8/2003 | Child | | 60/772 |
| 6,981,377 B2 * | 1/2006 | Vaynberg et al. | | 60/641.8 |
| 7,442,239 B2 * | 10/2008 | Armstrong et al. | | 96/155 |
| 8,601,814 B2 * | 12/2013 | Kaplan et al. | | 60/641.2 |
| 2006/0066113 A1 * | 3/2006 | Ebrahim et al. | | 290/52 |
| 2006/0112693 A1 * | 6/2006 | Sundel | | 60/670 |
| 2008/0250789 A1 * | 10/2008 | Myers et al. | | 60/645 |
| 2011/0061387 A1 * | 3/2011 | Held et al. | | 60/651 |

* cited by examiner

*Primary Examiner* — Thomas Denion
*Assistant Examiner* — Laert Dounis
(74) *Attorney, Agent, or Firm* — Edmonds & Nolte, PC

(57) ABSTRACT

A heat engine system is disclosed and includes first and second condensers fluidly and structurally coupled to first and second recuperators. An expansion device is coupled to the condensers at a drive end and suspended from the recuperators at a non-drive end. The recuperators can be printed circuit heat exchangers which provide superior heat transfer capabilities but are also robust enough to support the expansion device, and thereby form an integral part of a structural baseplate for mounting and aligning various components of the heat engine system. Exhaust conduits extending between the expansion device and the recuperators also provide added structural support for the expansion device.

20 Claims, 2 Drawing Sheets

COMBINED HEAT EXCHANGER EXPANDER MOUNTING SYSTEM

The present application claims priority to U.S. Provisional Patent Application Ser. No. 61/514,545, which was filed Aug. 3, 2011. This priority application is hereby incorporated by reference in its entirety into the present application, to the extent that it is not inconsistent with the present application.

BACKGROUND

Heat engines are used to convert heat or thermal energy into useful mechanical work and are often used in power generation plants. One example of a heat engine is an expander-generator system which generally includes an expander (e.g., a turbine) rotatably coupled to a generator or other power generating device via a common shaft. As working fluids are expanded in the expander, the shaft connecting the turbine and generator rotates and generates electricity in the generator.

Most power plant expander-generators are based on the Rankine cycle and obtain high temperature and pressure working fluids through the combustion of coal, natural gas, oil, and/or nuclear fission. The typical working fluid for Rankine cycles is water (steam). Recently, however, due to perceived benefits in terms of hardware compactness, efficiency, and heat transfer characteristics, there has been considerable interest in using super-critical carbon dioxide ($ScCO_2$) as a working fluid for certain expander-generator applications. Notable among such applications are nuclear, solar, geothermal, and waste heat energy conversion cycles.

Although $ScCO_2$ has several remarkable advantages as a working fluid, its low specific heat makes its use in waste-heat recovery cycles problematic. For instance, its low specific heat results in a relatively small temperature drop in the $ScCO_2$ gas through a typical heat cycle pressure/expansion process. This relatively small temperature drop can limit the amount of recoverable waste heat energy using simple Rankine (or Brayton) cycles, especially for applications utilizing waste heat streams having high initial gas temperatures.

In an effort to recover more waste heat energy in a heat recovery cycle, one or more recuperators are typically added to the system. The recuperators transfer a portion of the heat energy remaining in the working fluid after expansion to the working fluid at some other place in the thermodynamic cycle (usually after the pump or compression process, depending on the type of cycle being used). Using multiple recuperators increases the structural footprint of the system since each individual piece of equipment in the system is normally mounted separately to a large structural baseplate. Accordingly, although adding conventional recuperators to the system serves an important purpose, it simultaneously consumes valuable floor space that could otherwise be used for other beneficial applications or reduce the size and cost of the system.

What is needed, therefore, is a simple, compact waste heat recovery system that utilizes recuperators but also reduces the overall footprint and cost of the system.

SUMMARY

Embodiments of the disclosure may provide a support structure for a heat engine system. The support structure may include one or more condensers mounted to a gearbox mount and extending vertically therefrom, and one or more recuperators structurally and fluidly coupled to the one or more condensers and extending horizontally from the one or more condensers. The support structure may further include a structural component extending from the one or more recuperators and supporting a non-drive end of an expansion device, the expansion device further being coupled to the one or more condensers at a drive end.

Embodiments of the disclosure may further provide a method for supporting an expansion device in a heat engine system. The method may include mounting first and second condensers to a gearbox mount in a vertical disposition, the first condenser being mounted adjacent the second condenser. The method may also include coupling a first recuperator to the first condenser such that the first recuperator extends horizontally from the first condenser, the first recuperator being fluidly and structurally coupled to the first condenser, and coupling a second recuperator to the second condenser adjacent the first recuperator such that the second recuperator extends horizontally from the second condenser, the second recuperator being fluidly and structurally coupled to the second condenser. The method may further include coupling the expansion device to the first and second condensers at a drive end of the expansion device, and supporting the expansion device at a non-drive end of the expansion device with a structural component coupled to the non-drive end and at least one of the first or second recuperators.

Embodiments of the disclosure may further provide a heat engine system. The heat engine system may include a first condenser mounted to a gearbox mount and defining a first condenser outlet for discharging a first target fluid flow, a second condenser mounted to the gearbox mount adjacent the first condenser and defining a second condenser outlet for discharging a second target fluid flow, and a first recuperator structurally and fluidly coupled to the first condenser such that the first recuperator extends horizontally from the first condenser, the first recuperator defining a first exhaust inlet, a first target fluid inlet, and a first target fluid outlet, wherein the first target fluid inlet is in fluid communication with the first target fluid outlet. The heat engine system may further include a second recuperator structurally and fluidly coupled to the second condenser adjacent the first recuperator such that the second recuperator extends horizontally from the second condenser, the second recuperator having a second exhaust inlet, a second target fluid inlet, and a second target fluid outlet, wherein the second target fluid inlet is in fluid communication with the second target fluid outlet. The heat engine system may also include an expansion device coupled to the first and second condensers at a drive end with a flange mount and supported by the first and second recuperators at a non-drive end with a structural component that extends between the non-drive end and the first and second recuperators, the expansion device having first and second inlets and first and second outlets. Moreover, the heat engine system can include a first exhaust conduit fluidly coupling the first outlet of the expansion device with the first exhaust inlet of the first recuperator, and a second exhaust conduit fluidly coupling the second outlet of the expansion device with the second exhaust inlet of the second recuperator.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
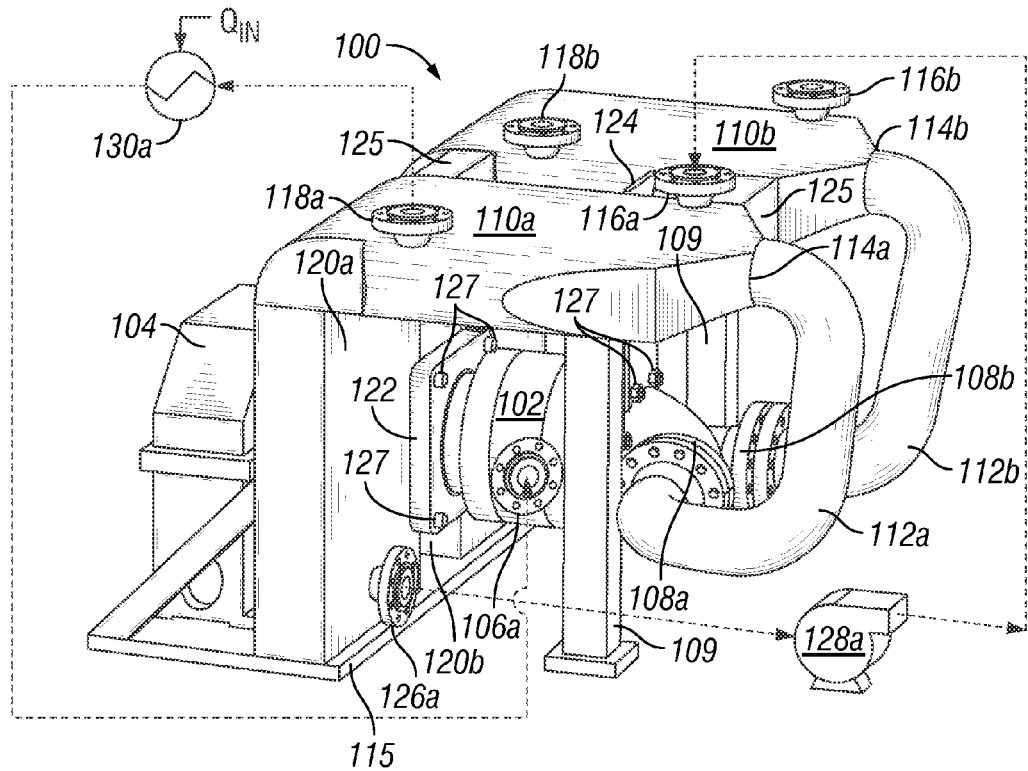
FIG. 1 illustrates an isometric view of a heat engine system, according to one or more embodiments of the disclosure.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 2:
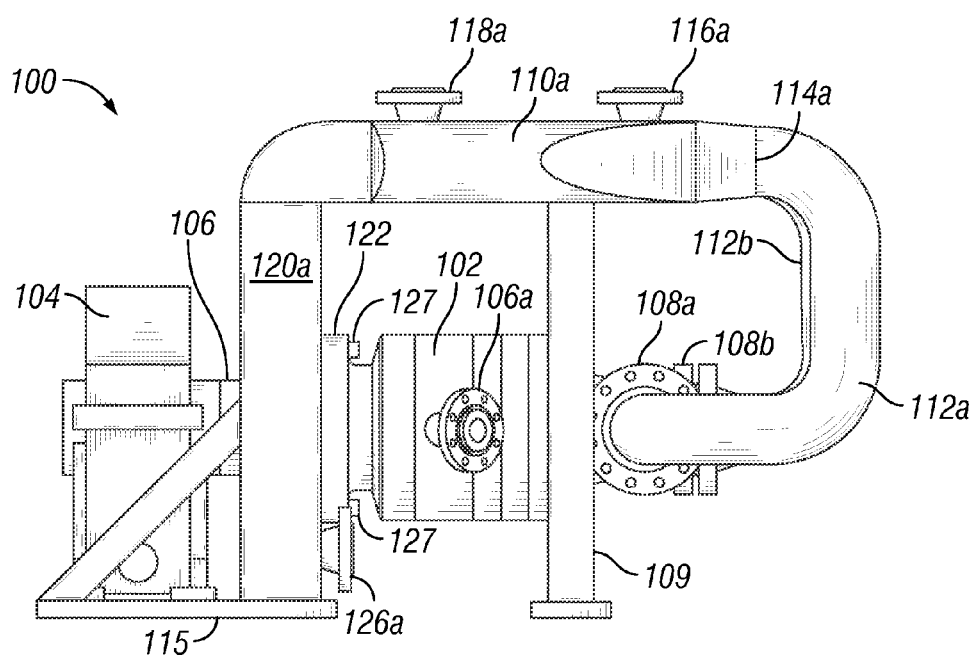
FIG. 2 illustrates a side view of the heat engine system of FIG. 1.
Figure 3:
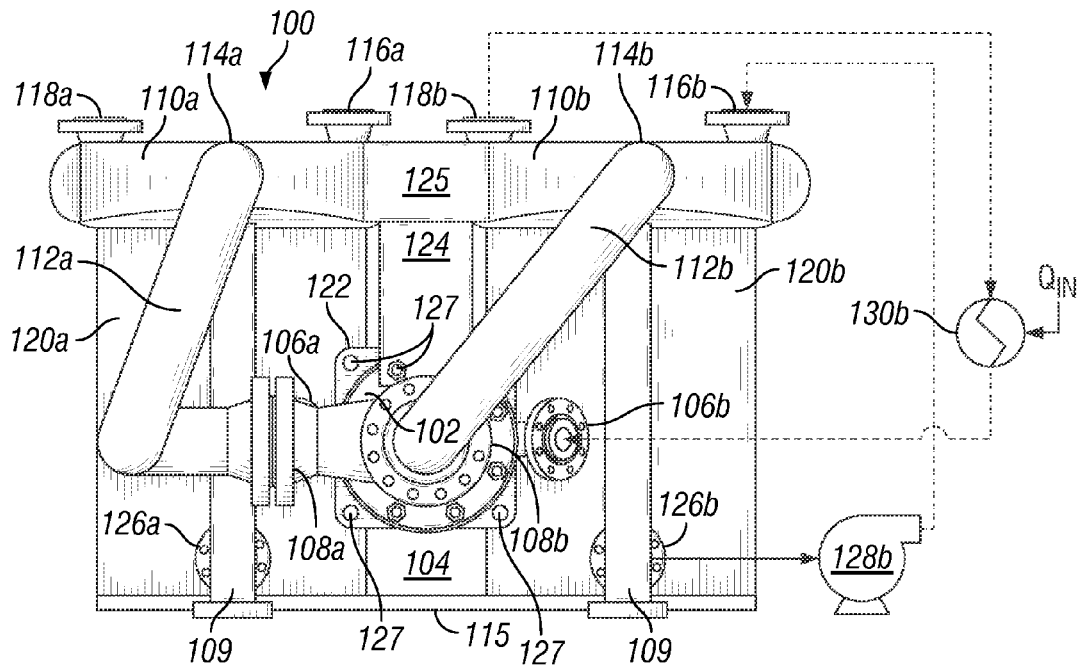
FIG. 3 illustrates a frontal end view of the heat engine system of FIG. 1.

Referring to FIGS. 1-3, illustrated is part of an exemplary heat engine system 100, which may also be referred to as a thermal engine, a power generation device, a heat or waste heat recovery system, and/or a heat to electricity system. FIG. 1 depicts an isometric view of a portion of the heat engine system 100, FIG. 2 depicts a side view of the same, and FIG. 3 depicts a frontal end view of the partial heat engine system 100. The heat engine system 100 may encompass one or more elements of a Rankine thermodynamic cycle configured to produce power from a wide range of thermal sources. As illustrated, the heat engine system 100 may include two cascaded equipment trains to process parallel thermodynamic cycles running at substantially the same pressures but at different temperatures. It will be appreciated, however, that the heat engine system 100 may encompass other forms of thermodynamic cycles, including, but not limited to, single, cascaded, parallel, or combinations thereof.

The working fluid used in the heat engine system 100 may be carbon dioxide ($CO_2$). It should be noted that use of the term $CO_2$ is not intended to be limited to $CO_2$ of any particular type, purity, or grade. For example, industrial grade $CO_2$ may be used without departing from the scope of the disclosure. In other embodiments, the working fluid may a binary, ternary, or other working fluid blend. For instance, an exemplary working fluid combination can be selected for the unique attributes possessed by the combination within a heat recovery system, such as described herein. One such fluid combination includes a liquid absorbent and $CO_2$ mixture enabling the combination to be pumped in a liquid state to high pressure with less energy input than required to compress $CO_2$ independently. In other embodiments, the working fluid may be a combination of $CO_2$ and one or more other miscible fluids. In yet other embodiments, the working fluid may be a combination of $CO_2$ and propane, or $CO_2$ and ammonia.

Use of the term "working fluid" is not intended to limit the state or phase of matter that the working fluid is in. For instance, the working fluid may be in a liquid phase, a gas phase, a supercritical state, a subcritical state, or any other phase or state at any one or more points within the heat engine system 100 or thermodynamic cycle. In one or more embodiments, the working fluid is in a supercritical state over certain portions of the heat engine system 100 (i.e., a high pressure side), and in a subcritical state at other portions of the heat engine system 100 (i.e., a low pressure side). In other embodiments, the entire thermodynamic cycle may be operated such that the working fluid is maintained in either a supercritical or subcritical state throughout the entire working fluid circuit.

The heat engine system 100 may include an expansion device 102 operatively coupled to a gearbox 104 via a common shaft 106 (FIG. 2). The gearbox 104 may be utilized for speed reduction to drive a standard multi-pole generator or an alternator for power generation. In other embodiments, the gearbox 104 may provide mechanical work to other driven devices such as, but not limited to, a pump, a mill, or a compressor. The gearbox 104 may be structurally mounted to a gearbox mount 115 via any known mounting scheme, such as, but not limited to, mechanical fasteners, welding, brazing, or combinations thereof.

The expansion device 102 may be an axial-flow expander or turbine. In one or more embodiments, the expansion device 102 may be an axial, parallel flow expander such as the expander described in co-pending U.S. patent application Ser. No. 13/562,411, filed Jul. 31, 2012, entitled "Parallel Cascaded Cycle Gas Expander," the contents of which are hereby incorporated by reference to the extent consistent with the disclosure. In other embodiments, however, the expansion device 102 may be a radial-flow turbomachine or a positive displacement expander without departing from the scope of the disclosure.

The expansion device 102 may include a first inlet 106a and a second inlet 106b (FIG. 3) for receiving the working fluid to be expanded therein. As illustrated, the second inlet 106b may be offset from the first inlet 106a by about 180 degrees about the circumference of the expansion device 102. In other embodiments, however, the inlets 106a,b may be circumferentially-offset by more or less than 180 degrees, without departing from the scope of the disclosure. The first inlet 106a may be configured to receive a first or low temperature working fluid flow and the second inlet 110b may be configured to receive a second or high temperature working fluid flow. As suggested, the second working fluid flow may exhibit a temperature that generally exceeds that of the first working fluid flow. Although the temperatures of the first and second working fluid flows may be different, the respective pressures of each stream may be substantially similar.

Expansion of the first and second working fluid flows within the expansion device 102 forces the internal components of the expansion device 102 to rotate, and thereby drive the shaft 106 to transmit mechanical work to the gearbox 104. Following expansion in the expansion device 102, the first working fluid flow is discharged via a first outlet 108a and the second working fluid flow is discharged via a second outlet 108b.

The heat engine system 100 may further include a first recuperator 110a and a second recuperator 110b, where each recuperator 110a,b is supported by one or more support feet 109 in a twin-mounted, horizontal configuration. The first recuperator 110a may be fluidly coupled to the expansion device 102 via a first exhaust conduit 112a that extends from the first outlet 108a to an exhaust inlet 114a of the first recuperator 110a. Likewise, the second recuperator 110b may be fluidly coupled to the expansion device 102 via a second exhaust conduit 112b that extends from the second outlet 108b to an exhaust inlet 114b of the second recuperator 110b. Accordingly, the first recuperator 110a may be configured to receive the low temperature, first working fluid flow exhausted from the expansion device 102 and the second recuperator 110b may be configured to receive the high temperature, second working fluid flow exhausted from the expansion device 102.

The first recuperator 110a may further have or otherwise define a first target fluid inlet 116a and a first target fluid outlet 118a. Likewise, the second recuperator 110b may have or otherwise define a second target fluid inlet 116b and a second target fluid outlet 118b. The function and purpose of the target fluid inlets 116a,b and target fluid outlets 118a,b will be described in more detail below.

The heat engine system 100 may further include a first condenser 120a and a second condenser 120b. The first condenser 120a may be fluidly and structurally coupled to the first recuperator 110a, and the second condenser 120b may be fluidly and structurally coupled to the second recuperator 110b. Consequently, the first condenser 120a may be configured to receive the first working fluid flow as it is discharged from the first recuperator 110a, and the second condenser 120b may be configured to receive the second working fluid flow as it is discharged from the second recuperator 110b.

The condensers 120a,b may be twin condensers, vertically-oriented and structurally attached to the gearbox mount 115, and each recuperator 110a,b may be horizontally-mounted to the top each corresponding condenser 120a,b, respectively. The condensers 120a,b may be any device adapted to reduce the temperature of the respective working fluid flows such as, but not limited to, direct contact heat exchangers, trim coolers, mechanical refrigeration units, and/or any combination thereof. The recuperators 110a,b, on the other hand, may be or otherwise employ a printed circuit heat exchanger (PCHX). PCHXs are known in the art, such as those generally described in U.S. Pat. Nos. 6,921,518; 7,022,294; 7,033,553, and EP App. No. 86305842.6, the contents of which are hereby incorporated by reference to the extent consistent with the present disclosure.

Briefly, a PCHX is a high-integrity, plate-type heat exchanger fabricated from multiple flat metal plates that have fluid flow channels chemically etched therein. The etched plates are stacked and diffusion bonded together to make the core of the heat exchanger. Headers and nozzles are strategically-attached to the core at its ends to complete the heat exchanger and thereby facilitate the flow and separation of two distinct process fluids within its core. During operation, heat transfer occurs between the two process fluids as each process fluid flows independently through its respective channels defined in the core.

As a consequence of their compact nature, PCHXs can achieve high thermal effectiveness and internal pressure containment. Moreover, because of their inherent monolithic nature, PCHXs are also highly robust structures that can provide a strong structural body as well. Consequently, the recuperators 110a,b may be structurally combined with the condensers 120a,b and the gearbox mount 115 to form a rigid, compact mounting structure for the expansion device 102. Furthermore, the exhaust conduits 112a,b can also function as structural connections, thereby increasing the sturdiness of the heat engine system 100.

For example, the expansion device 102 may be structurally mounted at its drive end (i.e., the left side of the expansion device as seen in FIGS. 1 and 2) to the condensers 120a,b using a flange mount 122. In one embodiment, the flange mount 122 forms an integral part of the expansion device 102. The non-drive end of the expansion device 102 (i.e., the right side of the expansion device 102 as seen in FIGS. 1 and 2) may be structurally mounted to or otherwise supported by the two recuperators 110a,b positioned thereabove using a structural component 124 (FIGS. 1 and 3). In at least one embodiment, the structural component may be a compliant, flex-plate 124 that is mechanically-fastened or otherwise fixed to expansion device 102 and the recuperators 110a,b. Moreover, one or more structural members 125 may also be arranged between each recuperator 110a,b in order to rigidly couple the recuperators 110a,b together, and thereby also form a more rigid mounting structure for the expansion device 102. As illustrated, the flange mount 122 and the flex-plate 124 may be mechanically-fastened to the condensers 120a,b and the expansion device 102, respectively, using a series of bolts 127 or other suitable mechanical fasteners. In other embodiments, the flange mount 122, flex-plate 124, and also the structural members 125 may be welded or otherwise brazed to the condensers 120a,b, recuperators 110a,b, and/or the expansion device 102, without departing from the scope of the disclosure. The combination of these components 115, 110a,b, 120a,b, and 109 effectively constitute a structural baseplate for the expander train as they provide support and maintain alignment of the various rotating equipment units. They also simultaneously provide required cycle heat transfer functionality in the same space without additional separate components with their attendant extra weight, cost, and volume.

In operation, the recuperators 110a,b may be configured to transfer residual thermal energy from the first and second working fluid flows exhausted from the expansion device 102 to corresponding downstream portions of the first and second working fluid flows (i.e., first and second target fluid flows) introduced into the recuperators 110a,b via the first and second target fluid inlets 116a,b, respectively. To initiate or otherwise facilitate this heat transfer, the first condenser 120a may have or define a first condenser outlet 126a and the second condenser 120b may have or define a second condenser outlet 126b (shown partially in FIG. 3).

Referring specifically to FIG. 1, the first condenser outlet 126a may be fluidly coupled to a first feed pump 128a and configured to discharge a low temperature form of the first working fluid flow received from the first condenser 120a. As used herein, the low temperature form of the first working fluid flow is characterized as the first target fluid flow. As a result of passing through the condenser 120a, the first target fluid flow may be in a liquid or a liquid-gas phase. In other embodiments, however, the first target fluid flow may be discharged from the condenser 120a in a supercritical state, as briefly described above. The first feed pump 128a may receive and pressurize the first target fluid flow and direct it to the first target fluid inlet 116a which is fluidly coupled to the first feed pump 128a via suitable conduits or piping.

As the first target fluid flow courses through the first recuperator 110a, residual thermal energy from the first working fluid flow derived from the expansion device 102 is transferred to the first target fluid flow. Consequently, the temperature of the first target fluid flow is increased while the temperature of the first working fluid flow is simultaneously decreased. The first target fluid flow is eventually discharged from the first recuperator 110a via the first target fluid outlet 118a and directed to a first heat exchanger 130a.

The first heat exchanger 130a may be configured to further increase the temperature of the first target fluid flow by subjecting the first target fluid flow to an external heat source $Q_{in}$. The first heat exchanger 130a is in thermal communication with the external heat source $Q_{in}$ which may derive thermal energy from a variety of thermal sources. For example, the external heat source $Q_{in}$ may be a waste heat stream such as, but not limited to, gas turbine exhaust, process stream exhaust, or other combustion product exhaust streams, such as furnace or boiler exhaust streams. In other embodiments, the external heat source $Q_{in}$ may derive thermal energy from renewable sources of thermal energy such as, but not limited to, solar thermal and geothermal sources.

The first target fluid flow discharged from the first heat exchanger 130a may then be routed back to the expansion device 102. After being introduced into the expansion device 102 via the first inlet 106a, the first target fluid flow is expanded within the expansion device 102 once again, as described above with reference to the first working fluid flow.

Referring now specifically to FIG. 3, transferring residual thermal energy from the second working fluid flow exhausted from the expansion device 102 to a corresponding downstream portion (i.e., the second target fluid flow) is substantially similar to the thermal transfer of the first working fluid flow described above. For example, the second condenser outlet 126b may be fluidly coupled to a second feed pump 128b and configured to discharge a low temperature form of the second working fluid flow received from the second condenser 120b. The low temperature form of the second working fluid flow may be characterized as the second target fluid flow and may be in a liquid, a liquid-gas phase, or a supercritical state. The second feed pump 128b may receive and pressurize the second target fluid flow and direct it to the second target fluid inlet 116b which is fluidly coupled to the second feed pump 128b via suitable conduits and/or piping.

As the second target fluid flow courses through the second recuperator 110b, residual thermal energy from the second working fluid flow derived from the expansion device 102 is transferred to the second target fluid flow. Consequently, the temperature of the second target fluid flow is increased while the temperature of the second working fluid flow is simultaneously decreased. The second target fluid flow is eventually discharged from the second recuperator 110b via the second target fluid outlet 118b and directed to a second heat exchanger 130b configured to further increase the temperature of the second target fluid flow.

Similar to the first heat exchanger 130a, the second heat exchanger 130b may be in thermal communication with the external heat source $Q_{in}$. In one embodiment, the first and second heat exchangers 130a,b may be first and second stages of a single or combined heat exchanger. In other embodiments, the first and second heat exchangers 130a,b may be separate heat exchangers arranged in series within a stream of the external heat source $Q_{in}$. Accordingly, the second heat exchanger 130b may serve as a high temperature heat exchanger (e.g., a higher temperature relative to the first heat exchanger 130a) adapted to receive initial thermal energy from the external heat source $Q_{in}$. The first heat exchanger 130a may serve as a low temperature heat exchanger by receiving residual thermal energy from the external heat source via a serial connection arranged downstream from the second heat exchanger 130b.

The second target fluid flow discharged from the second heat exchanger 130b may then be routed to the expansion device 102 via the second inlet 106b whereby the second target fluid flow is expanded, as described above with reference to the second working fluid flow. Accordingly, the heat engine system 100 may be configured to transform waste heat derived from the external heat source $Q_{in}$ into electricity for applications ranging from bottom cycling in gas turbines, stationary diesel engine gensets, industrial waste heat recovery (e.g., in refineries and compression stations), hybrid alternatives to the internal combustion engine, renewable sources of thermal energy, and/or combinations of the same.

As can now be appreciated, the recuperators 110a,b serve a dual purpose in the heat engine system 100 by not only transferring thermal energy between two independent fluid flows, but also by providing integral structural support for the expansion device 102. The combination of the recuperators 110a,b, the condensers 120a,b, and the gearbox mount 115 creates a structural baseplate that is rigid enough to mount and support the expansion device 102, but compact enough to provide a clean package that offers easy access to the process equipment of the entire heat engine system 100. Consequently, the heat engine system 100 exhibits an effective package layout that requires very little interconnecting piping which is often the source of significant energy losses. Moreover, because this multi-purpose structural baseplate is actively held at controlled temperatures by the one or more PCHXs arranged therein and through the minimization of interconnecting piping, thermal and/or pressure-induced machinery misalignment is greatly minimized.

As can also be appreciated, the strength of the combination of the recuperators 110a,b, the condensers 120a,b, and the gearbox mount 115 may further be sufficient to support and/or otherwise mount other components of the heat engine system 100 besides the expansion device 102. For example, the feed pumps 128a,b and the heat exchangers 130a,b may also be mounted to either the recuperators 110a,b or the condensers 120a,b, without departing from the scope of the disclosure.

Furthermore, although the heat engine system 100 is generally shown and described as having dual recuperators 110a,b and dual condensers 120a,b it should be noted that embodiments contemplated herein include a single recuperator fluidly and structurally coupled to a single condenser, where the expansion device 102 is coupled to the single condenser at a drive end and suspended from the single recuperator at a non-drive end. In other embodiments, the number of recuperators 110a,b and condensers 120a,b may vary, depending on the application, without departing from the scope of the disclosure.

Figure 4:
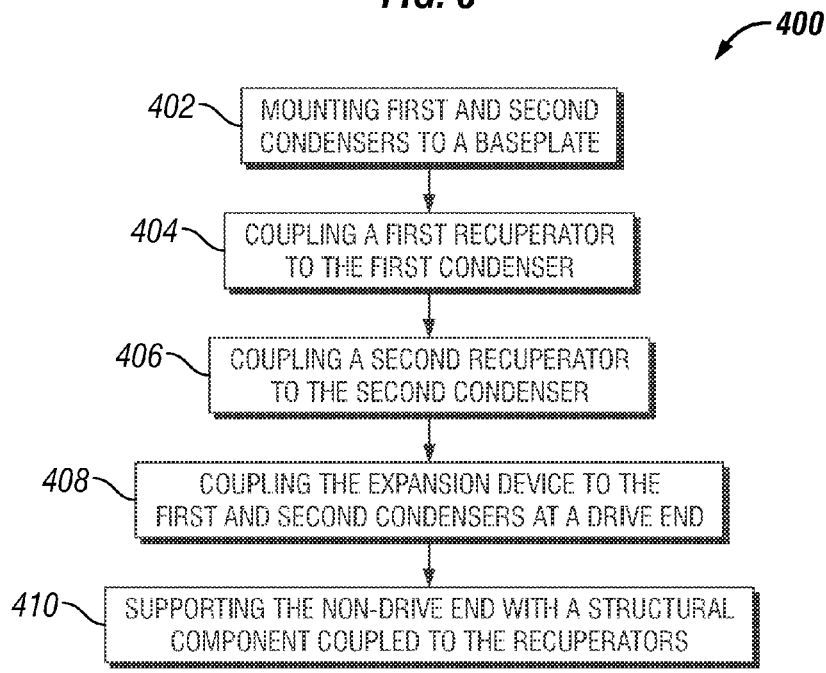
FIG. 4 illustrates a flowchart of a method for supporting an expansion device in a heat engine system, according to one or more embodiments disclosed.

Referring now to FIG. 4, illustrated is a method 400 for supporting an expansion device in a heat engine system. The method 400 may include mounting first and second condensers to a gearbox mount, as at 402. The condensers may be mounted in a generally vertical disposition, and the first condenser may be mounted adjacent the second condenser. A first recuperator may be coupled to the first condenser, as at 404. The first recuperator may be fluidly and structurally coupled to the first condenser such that the first recuperator extends horizontally from the first condenser. Likewise, a second recuperator may be to the second condenser adjacent the first recuperator, as at 406. The second recuperator may be fluidly and structurally coupled to the second condenser such that the second recuperator extends horizontally from the second condenser.

The method 400 may further include coupling the expansion device to the first and second condensers at a drive end of the expansion device, as at 408. The expansion device may be supported at a non-drive end with a structural component coupled to the non-drive end and at least one of the first or second recuperators, as at 410.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A support structure for a heat engine system, comprising:
   one or more condensers mounted to a gearbox mount and extending vertically therefrom;
   one or more recuperators structurally mounted and fluidly coupled to the one or more condensers and extending horizontally from one end of the one or more condensers; and
   a structural component extending from the one or more recuperators and supporting a non-drive end of an expansion device, the expansion device further being structurally coupled to the one or more condensers at a drive end.

2. The support structure of claim 1, further comprising a gearbox mounted to the gearbox mount and operatively coupled to the expansion device via a common shaft, the gearbox being adapted to provide mechanical work to a generator for generating electricity.

3. The support structure of claim 1, further comprising a flange mount used to couple the expansion device to the one or more condensers.

4. The support structure of claim 1, wherein the one or more condensers are first and second condensers and the one or more recuperators are first and second recuperators, the support structure further comprising:
   a first exhaust conduit fluidly coupled to the expansion device at a first outlet, the first exhaust conduit extending from the first outlet to the first recuperator; and
   a second exhaust conduit fluidly coupled to the expansion device at a second outlet, the second exhaust conduit extending from the second outlet to the second recuperator, wherein the first and second exhaust conduits provide additional structural support for the expansion device.

5. The support structure of claim 4, further comprising one or more structural members disposed between the first and second recuperators and configured to couple the first recuperator to the second recuperator.

6. The support structure of claim 4, wherein the first and second recuperators are printed circuit heat exchangers.

7. The support structure of claim 1, further comprising one or more support feet coupled to the one or more recuperators to support the one or more recuperators horizontally.

8. The support structure of claim 1, wherein the structural component is a compliant, flex-plate.

9. A method for supporting an expansion device in a heat engine system, comprising:
   mounting first and second condensers to a gearbox mount in a vertical disposition, the first condenser being mounted adjacent the second condenser;
   coupling a first recuperator to the first condenser such that the first recuperator extends horizontally from one end of the first condenser, the first recuperator being structurally mounted and fluidly coupled to the first condenser;
   coupling a second recuperator to the second condenser adjacent the first recuperator such that the second recuperator extends horizontally from one end of the second condenser, the second recuperator being structurally mounted and fluidly coupled to the second condenser;
   structurally coupling the expansion device to the first and second condensers at a drive end of the expansion device; and
   supporting the expansion device at a non-drive end of the expansion device with a structural component coupled to the non-drive end and at least one of the first or second recuperators.

10. The method of claim 9, wherein coupling the expansion device to the first and second condensers further comprises coupling a flange mount to the first and second condensers, the flange mount forming an integral part of the expansion device.

11. The method of claim 9, further comprising coupling the first recuperator to the second recuperator with one or more structural members disposed between the first and second recuperators.

12. The method of claim 9, further comprising:
   mounting a gearbox to the gearbox mount; and
   operatively coupling the gearbox to the expansion device via a common shaft.

13. The method of claim 9, further comprising:
   coupling a first exhaust conduit to a first outlet of the expansion device, the first exhaust conduit extending between the first outlet and the first recuperator; and
   coupling a second exhaust conduit to a second outlet of the expansion device, the second exhaust conduit extending between the second outlet and the second recuperator, wherein the first and second exhaust conduits provide additional structural support for the expansion device.

14. The method of claim 9, further comprising supporting the first and second recuperators in a horizontal disposition with one or more support feet.

15. A heat engine system, comprising:
   a first condenser mounted to a gearbox mount and defining a first condenser outlet for discharging a first target fluid flow;
   a second condenser mounted to the gearbox mount adjacent the first condenser and defining a second condenser outlet for discharging a second target fluid flow;

a first recuperator structurally mounted and fluidly coupled to the first condenser such that the first recuperator extends horizontally from one end of the first condenser, the first recuperator defining a first exhaust inlet, a first target fluid inlet, and a first target fluid outlet, wherein the first target fluid inlet is in fluid communication with the first target fluid outlet;

a second recuperator structurally mounted and fluidly coupled to the second condenser adjacent the first recuperator such that the second recuperator extends horizontally from one end of the second condenser, the second recuperator having a second exhaust inlet, a second target fluid inlet, and a second target fluid outlet, wherein the second target fluid inlet is in fluid communication with the second target fluid outlet;

an expansion device structurally coupled to the first and second condensers at a drive end with a flange mount and supported by the first and second recuperators at a non-drive end with a structural component that extends between the non-drive end and the first and second recuperators, the expansion device having first and second inlets and first and second outlets;

a first exhaust conduit fluidly coupling the first outlet of the expansion device with the first exhaust inlet of the first recuperator; and a second exhaust conduit fluidly coupling the second outlet of the expansion device with the second exhaust inlet of the second recuperator.

16. The heat engine system of claim 15, further comprising:

a first feed pump fluidly coupled to the first condenser outlet, the first feed pump being configured to circulate the first target fluid flow into the first recuperator via the first target fluid inlet;

a second feed pump fluidly coupled to the second condenser outlet, the second feed pump being configured to circulate the second target fluid flow into the second recuperator via the second target fluid inlet;

a first heat exchanger fluidly coupled to the first target fluid outlet and configured to increase a temperature of the first target fluid flow and discharge the first target fluid flow into the expansion device via the first inlet; and a second heat exchanger fluidly coupled to the second target fluid outlet and configured to increase a temperature of the second target fluid flow and discharge the second target fluid flow into the expansion device via the second inlet.

17. The heat engine system of claim 16, wherein the first and second heat exchangers are in thermal communication with an external heat source.

18. The heat engine system of claim 16, wherein the first and second heat exchangers are arranged in series in the external heat source.

19. The heat engine system of claim 16, wherein the first and second feed pumps are mounted to one of the first and second recuperators or the first and second condensers.

20. The heat engine system of claim 15, wherein the first and second recuperators are printed circuit heat exchangers.

* * * * *